Oct. 13, 1964  R. W. BURDEN ETAL  3,152,522
ACTUATOR
Filed April 23, 1962.  2 Sheets-Sheet 1

ROBERT W. BURDEN
DAVID L. SCHMIDT
INVENTORS

BY H.C. Goldwire
AGENT

Oct. 13, 1964  R. W. BURDEN ETAL  3,152,522
ACTUATOR
Filed April 23, 1962  2 Sheets-Sheet 2

ROBERT W. BURDEN
DAVID L. SCHMIDT
INVENTORS

BY J.H.C. Goldwire

AGENT

United States Patent Office 3,152,522
Patented Oct. 13, 1964

3,152,522
ACTUATOR
Robert W. Burden and David L. Schmidt, Dallas, Tex., assignors to Ling-Temco-Vought, Inc., Dallas, Tex., a corporation of Delaware
Filed Apr. 23, 1962, Ser. No. 189,643
4 Claims. (Cl. 92—112)

This invention relates to fluid-powered actuators and means for mounting the same and effecting connection into a fluid powering system and in particular to an actuator in which the pivotal mounting means serves also to connect the actuator into the fluid powering system.

While reference will be made herein, in describing the constructions shown in the various figures of the drawing, to a hydraulic actuator adapted for powering by a hydraulic system, it will be understood that the actuators shown are operable by other fluids, e.g. a gas, supplied under pressure, and that the invention is not limited to an actuator powered by a hydraulic system.

A major object of the present invention is to provide an improved actuator having pivotable means for attaching the actuator to a fixed structure and carrying the flow channels for connection of the actuator into a fluid powering system.

Another object is to provide an actuator of the type characterized above having improved means for snubbing travel of the piston at one or both ends of its stroke.

A related object is to provide an actuator and connecting and mounting means therefor which allow pivoting of the actuator and dispense with flexible tubing for connecting the actuator into the fluid powering system.

A further object is to provide an actuator which is of superior ability in resisting loads tending to shift the piston rod axis relative to the cylinder axis when the rod is extended and which nonetheless need be of no greater length.

Other objects and advantages will be apparent from the specification and claims and from the accompanying drawing illustrative of the invention.

Figure 1:
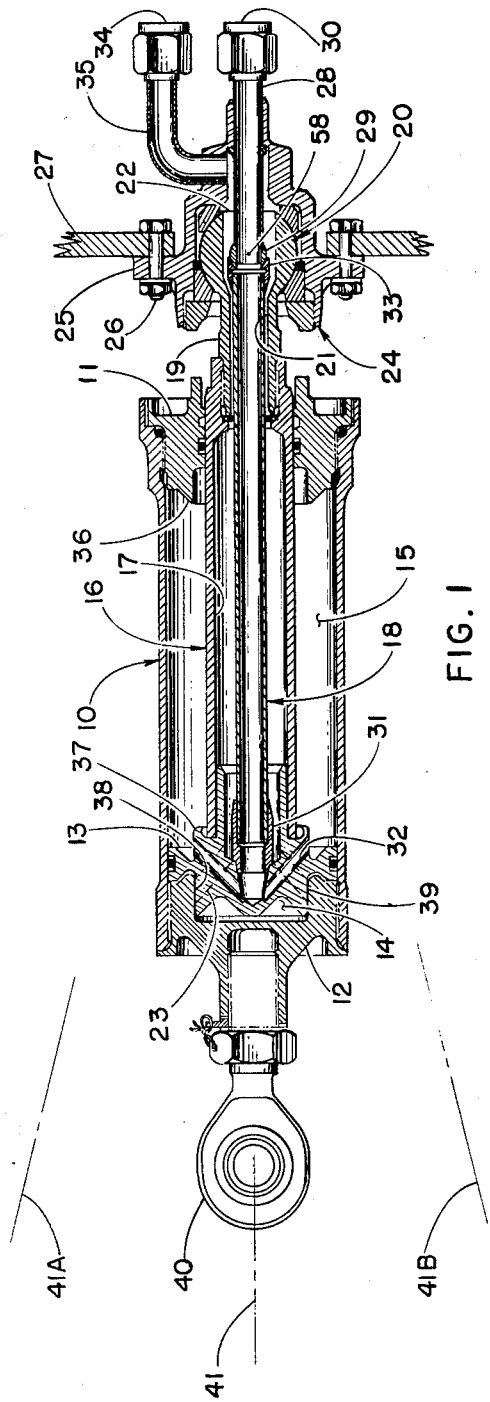
FIGURE 1 is a longitudinal, sectional view of an embodiment of the invention.

With reference to FIGURE 1, the hydraulic actuator comprises a cylinder 10 having two ends closed by first and second end walls 11, 12 each provided with a central opening. Slidably mounted in the cylinder 10, a piston 13 divides the cylinder into first and second chambers 14, 15. Rigidly and concentrically mounted on one face of the piston 13 is a rod 16 which slidingly and sealingly extends through the central opening of the first end wall 11 and which has an outer end which lies outside the cylinder 10 throughout the stroke of the piston. At one extreme of its stroke, the piston 13 approaches the first end wall 11, thereby extending the rod 16 relative to the cylinder 10; the other end wall 12, of course, is approached by the piston as the rod is retracted into the cylinder 10. Of hollow construction, the rod 16 encloses an axially extending passage 17 which originates at the piston 13 and extends within the rod through the rod outer end. The passage 17 is of larger diameter than and receives a tube 18 (to be described).

Rigidly mounted on the outer end of the rod 16 is a shank 19 whose one end is threaded into and which sealingly closes the outer end of the rod passage 17. On the other end of the shank 19 is a ball 20 which thus, through the shank, is rigidly mounted on an end of the rod 16. A passage 21 extending axially through the ball 20 and shank 19 opens at 22 through the crown of the ball and, through the rigidly mounted end of the shank, into the rod passage 17. The passage 17, 21 through the rod 16, shank 19, and ball 20 from the piston 13 has communication with the cylinder first chamber 14 through at least one passage 23 leading through the piston 13 from the rod passage 17 into the cylinder first chamber 14.

The ball 20 is firmly but rotatably received by the spherical cavity of a socket 24. A flange or plurality of lugs 25 on the socket 24 receives bolts 26 or the like by means of which the socket may be rigidly mounted on a fixed structure such as the bulkhead 27. It will be noted that the face of the flange 25 faying with the bulkhead 27 preferably lies in a plane passing through the center 58 of the ball 20; pivoting of the cylinder 10 about the ball thus is about a center lying in the plane of the bulkhead. Loads placed on the socket 24, for example upon hydraulic energization of the actuator, therefore do not place a twisting force on the socket 24 with respect to the bulkhead 27 as they would if the pivot center 58 were displaced outwardly of the bulkhead.

A first tube 28 is rigidly and sealingly fixed in the socket 24 and has an end provided with a smaller ball 29, of less diameter than the portion of the passage 21 within the larger ball 20, which is nominally concentric with the larger ball 20. The other end of the tube 28 lies outside the socket and is provided with a first port 30 adapted to be connected into a line (not shown) of a hydraulic system.

A second tube 18 has one end rigidly mounted on the piston 13. In a preferred mode of accomplishing this mounting, the piston 13 has drilled therein a central bore. A sleeve 31 has one end brazed on the tube 18, while its other end has an oil-tight, pressed fit into the bore of the piston 13. Extension of the sleeve 31 into the bore is limited by appropriate stop means such as a shoulder on either the sleeve or piston bore. The open end of the rigid tube 18 received in the sleeve 31 has communication with the cylinder second chamber 15 through at least one passage 32 extending from the bore of the piston 13 through the piston into the second chamber 15. The second tube 18 is of smaller diameter than and extends through the rod, shank, and ball passage 17, 21; on its other end it bears a spherical seat 33 which is concentric with the larger and smaller balls 20, 29 and which sealingly receives the smaller ball 29. Communication of the second tube 18 with the first port 30 is through the interior of the first tube 28 and continuation thereof through the smaller ball 29 and spherical seat 33. The second tube 18 thus is axially fixed but pivotal relative to the ball 20 and has an end supported within the latter by engagement of the smaller ball 29 by the seat 33. To maintain a positive seal of the seat 33 with the ball 29, the second tube 18 preferably is elastically compressed between the piston 13 and the smaller ball 29 mounted on the first tube 28, and this is accomplished by making the tube 18 slightly longer than required to span the gap between the piston 13 and smaller ball 29. As the shank 19 is threaded into the end of the piston rod 16, then, the second tube 18 becomes compressively loaded as the piston 13 is moved toward the smaller ball 29. Care must be taken not to make the tube 18 so long that it will be permanently deformed upon assembly. It is preferable that the elastic-compressive loading in the tube 18 be such that at least a degree of compressive force be exerted by the seat 33 on the smaller ball 29 when the rod 16 is under full tensile load, as when the actuator is energized for retraction of the rod relative to the cylinder 10. In this way, elastic stretchings of the rod 16 under load are prevented from disrupting the integrity of the seal between the seat 33 and smaller ball 29.

The rod passage 17 is connected with a second port 34 adapted for connection with another line (not shown) of a hydraulic system through a tube 35 which opens into the passage 21 at a location within the socket 24 and thus communicates with the exterior of the smaller ball 29. Flow from the second port 34 is through the tube 35 into the socket and exteriorly of the smaller ball 29, spherical seat 33, and tube 18 into the rod passage 17, from which it exits through the at least one passage 23 into the cylinder first chamber 14.

The first end wall 11, approached by the piston 13 as the rod 16 is fully extended relative to the cylinder 10, has a portion in the form of an annular flange or shoulder 36 extending toward the other end wall 12 and having a cylindrical inner surface radially outwardly spaced from and concentric with the rod 16. In correspondence with this flange 36 is a first boss 37 on the piston 13 having a cylindrical surface through which the at least one passage 32 from the open end of the tube 18 opens into the second chamber 15. The cylindrical surface of the boss 37 has a diameter only slightly less than that of the diameter of the cylindrical surface of the flange 36 and mates with the latter, upon the rod 16 being fully extended relative to the cylinder 10, to at least partly close the at least one passage 32 in communication with the tube 18; hence, as the piston 13 nears the end of its stroke, it is snubbed and is constrained to move slowly just before it bottoms. A representative clearance between the two cylindrical surfaces is .010 inch, this being increased or decreased as desired to increase or decrease the speed of travel of the piston 13 in the terminal portion of its stroke.

In the second end wall 12, a bore forms a cylindrical surface 38 concentric with the rod 16 and only slightly larger in diameter than the cylindrical surface formed by a second boss 39 on the piston 13 which, when the rod 16 approaches full retraction, enters the bore 38 sufficiently to at least partly close the at least one passage 23 which leads from the rod passage 17 into the first chamber 14 and which opens into the first chamber through the cylindrical surface of the second boss 39. By this means, piston motion is snubbed as the rod 16 approaches full retraction.

Almost invariably, the body directly actuated by, and to which a hydraulic motor is connected, is a lever. Connection is at, for example, the rod end 40 of the actuator of the example. As the rod 16 extends and retracts, relative to the cylinder, the rod end 40 follows an arcuate path, and the cylinder 10 is pivotally deflected relative to the fixed structure 27 on which it is mounted. Thus, at an intermediate point of extension, the actuator centerline may, for example, lie as at 41, while the centerline may be shifted to 41A at full retraction and to 41B at full extension. The hydraulic system tubing (not shown) to the actuator is in the form of metallic tubes rigidly mounted on fixed structure relative to which the actuator is pivotable. To make hydraulic connection into the two ends of the actuator, therefore, the connecting means employed must make allowance for the pivoting motion of the actuator. In the past, this has been accomplished by employing flexible tubing in the terminal portions of the two hydraulic lines to a double-acting actuator. As the severity of operating conditions has increased, these lines have been rendered inadequate, for no known materials of construction have been available which could satisfactorily enable them to withstand the operating pressures and temperatures involved and yet retain a flexible form. In a high-pressure line, for example, working pressure commonly may stand at 4,000 p.s.i., while pressure surges may range up to 6,000 p.s.i.; meanwhile, the ambient air temperature may range to 650° F. To provide a tube flexible enough to withstand actuator pivoting and yet capable of resisting the high temperatures and pressures involved, coiled metallic tubes have been employed to make hydraulic connection at each end of the actuator. While these have met with a degree of success, their high bulk is very objectionable in aircraft applications, where limitations of space often preclude their use or make impossible their proper placement with respect to actuator movement.

In the present construction, no flexible tubing is employed; the actuator is connected to the hydraulic lines through rigid connection of the latter to the ports 30, 34 and is pivotally mounted on the bulkhead 27. For extension of the rod 16 relative to the cylinder 10, hydraulic fluid is admitted into the second port 34 through suitable hydraulic connections and valving (not shown) and withdrawn through the first port 30. Flow from the second port 34 is through tube 35 into the socket 24, through the ball 20 and shank 19 exteriorly of the tubes 18, 28 into the rod passage 17, and thence through the at least one passage 23 into the cylinder first chamber 14. Motion of the cylinder 10 to the left relative to the fixed piston 13 forces hydraulic fluid through the at least one passage 32 into the second tube 18, through seat 33 and smaller ball 29 into the first tube 28, and out the first port 30 into the hydraulic return line. For retraction of the rod 16, the hydraulic flow is reversed. As the piston 13 approaches the first end wall 11 upon full extension of the rod 16, the first boss 37 enters the annular shoulder 36 on the first end wall, thus substantially blocking hydraulic flow out of the second chamber 15 to the hydraulic system return line through the passage 32 leading into the tube 18 and consequently slowing the terminal portion of the "extend" stroke of the cylinder 10. A similar slowing of the cylinder 10 at the end of the "retract" stroke is effected by partial blockage of the passage or passages 23 leading from the cylinder first chamber 14 through the piston 13 into the rod passage 17, this blockage occurring when the piston second boss 39 enters the second end wall bore 38. Rotation of the smaller ball 29 within the seat 33 and the larger ball 20 in the socket 24 allows motion of the actuator relative to the bulkhead 27 and fixed hydraulic tubes 28, 35 while at the same time maintaining fluid-tight hydraulic connections.

A further and significant advantage is yielded by the above-described construction. Loads tending to swing the longitudinal axis of the piston rod 16 relative to the axis of the cylinder 10 are borne, of course, by the cylinder through its contact with the piston 13 and by the first end wall 11 through its contact with the rod 16. It will be readily understood that ability of any actuator to withstand such loads is lessened as the distance between the piston and the end wall through which the rod passes is decreased and is much reduced in an actuator wherein the piston actually bears against the end wall when the rod is fully extended. The annular shoulder 36 of the first end wall 11, besides serving its function described above, acts as a spacer which limits the approach of the piston 13 to the end wall 11. By preventing excessively great diminution of the distance between the piston 13 and end wall 11, therefore, the shoulder 36 adds to the strength of the actuator in resisting side-loads placed on the piston rod 16. No sacrifice in added length of the actuator for obtaining a given stroke of the rod 16 is imposed, however, by the shoulder 36. In the ordinary hydraulic actuator, spaces must be reserved at each end of the cylinder for ports for the admission of hydraulic fluid. In the present construction, no such ports are employed, and the saving in cylinder length effected by their omission can readily offset all the addition in length which tends to be imposed by the presence of shoulder 36.

In FIGURE 2, the actuator again comprises a cylinder 10C having mounted therein a piston 13C dividing the cylinder into first and second chambers 14C, 15C. The first end wall 11C has formed therein a spherical cavity which receives a ball 20C whose shank 19C extends outwardly of the cavity and is threaded for rigid attachment in a mating receptacle 49. The shank 19C is provided with an annular flange 25C by means of which it is attached to the receptacle 49 and a fixed body such as a bulkhead 27C.

The second end wall 12C again has a central opening through which slidingly and sealingly extends the piston rod 16C.

The first end wall 11C has a first port 43C whose inner end extends to the surface of the ball 20C and whose outer end is connected by a rigid tube 50 to a port 61 opening into the cylinder first chamber 14C at the second end wall 12C. A second port 51 in the first end wall 11C communicates with the cylinder second chamber 15C. A first port 22C in the ball 20C communicates with the socket first port 43C through an annular cavity 53 in the socket and encircling the ball and further has communication with a first port 54 in the end of the shank 19C via a passage. The ball 20C has a second port 42C opening into the second end wall port 51 and communicating with a shank second port 55 opening near the end and through the side of the shank 19C. The sizes of the annular cavity 53 and end wall port 51 are such, relative to the ball ports 22C, 42C, as to remain in communication with the latter throughout the range of pivoting of the cylinder 10C on the ball 20C in the spherical cavity of the end wall 11C. The receptacle 49 has a cavity closely receiving the end of the shank 19C and is provided with threaded openings 30C, 34C adapted for connection with respective hydraulic lines and communicating respectively with the shank ports 54, 55. Suitable sealing means are employed to isolate the shank ports 54, 55 from each other within the receptacle 49.

In the embodiment shown in FIGURE 3, the ball 20D again is received in a spherical cavity of the first end wall 11D of the cylinder. The piston 13D has an axial opening through which slidingly and sealingly extends a tube 18D having a free end lying within an axially extending passage 17D in the piston rod 16D of larger diameter than the tube. The other end of the tube 18D is rigidly and sealingly mounted in the first end wall 11D. The opening 47 from the rod passage 17D into the cylinder first chamber 14D is adjacent the piston 13D, and the rod passage has a reduced-diameter portion 46D at its outer end entered by the tube free end 45D for snubbing rod travel as the rod 16D reaches its full retraction. A first port 22D in the ball communicates with the open, rigidly mounted end of the tube 18D and a passage 54D leading through the end of the shank 19D. A second port 42D in the ball provides communication between the cylinder second chamber 15D and another passage 55D leading through the shank 19D. The sizes of the mating ports are such as to ensure their continued communication with each other throughout a given range of pivoting of the cylinder 10D on the ball 20D. The shank passages 54D, 55D are adapted for connection with lines of a hydraulic system by employing a receptacle (not shown) similar to the one shown at 49 in FIGURE 2.

Figure 2:
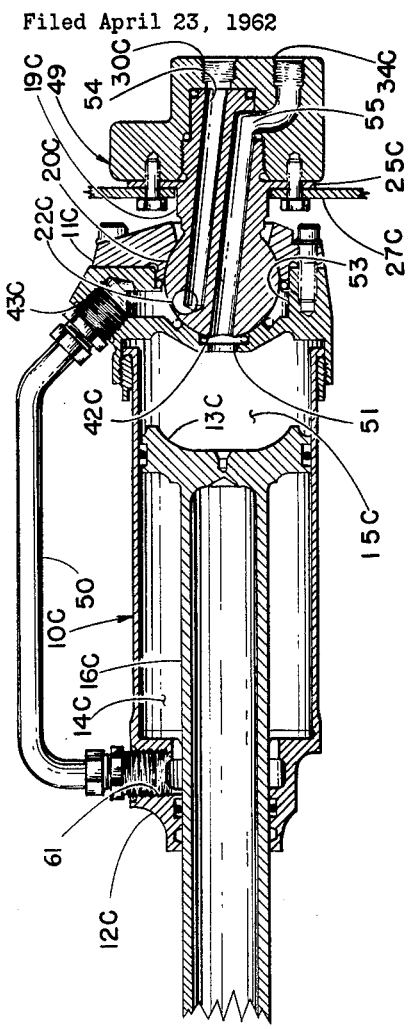
FIGURE 2 is a longitudinal sectional view of another modification of the invention.
Figure 3:
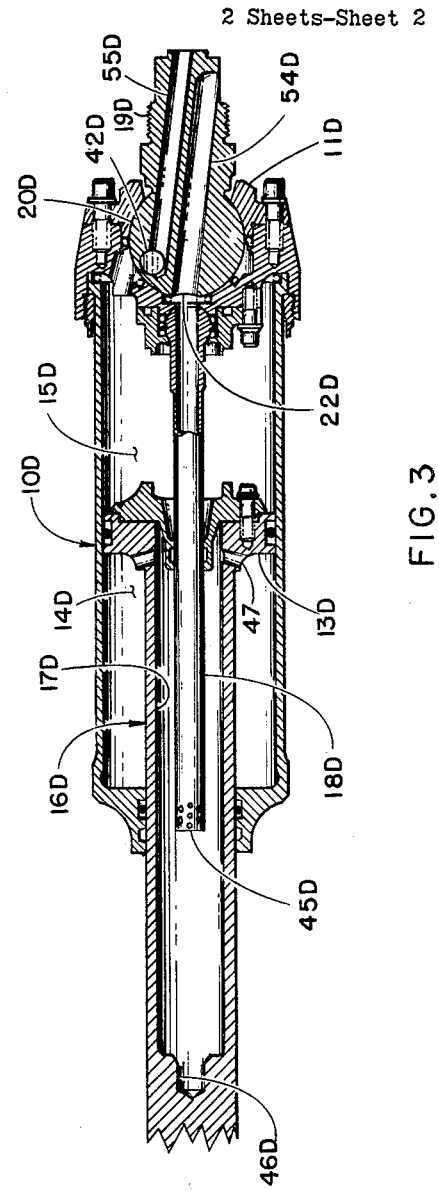
FIGURE 3 is a similar view of still another modification of the invention.

In both FIGURES 2 and 3, the path of hydraulic flow will be understood from what has previously been stated. A strong, pivotal mounting of the actuator on fixed structure is effected in the modifications shown in FIGURES 2 and 3, and the need for flexible hydraulic connections is completely obviated.

While only one embodiment of the invention, together with several modifications thereof, has been described herein and shown in the accompanying drawing, it will be evident that various further modifications are possible in the arrangement and construction of its components without departing from the scope of the invention.

We claim:
1. In combination,
   a fluid-powered actuator having a cylinder with first ond second end walls, a piston slidably mounted in the cylinder and dividing the same into first and second chambers, and a rod mounted on the piston and slidably extending through the first end wall, the rod having an end outside the cylinder;
   an axial passage within and extending substantially throughout the length of the rod;
   a shank having one end rigidly mounted on said rod end and closing the rod axial passage;
   a larger ball on the other end of the shank;
   a spherical socket receiving the ball;
   means for mounting the socket on a fixed structure for pivoting of the cylinder on the structure about the center of the larger ball;
   a passage through the ball and shank having one end opening through the crown of the ball into the socket and another end opening into the rod passage through said one end of the shank;
   a first tube rigidly and sealingly fixed in the socket and having an end provided with a smaller ball concentric with the larger ball, the tube having another end outside the socket and adapted for connection into a fluid powering system;
   a port adapted for connection to another line of a fluid powering system and opening through the socket into the axial passage of the ball and shank;
   at least one passage leading through the piston from the rod passage into the first chamber;
   a second tube of smaller diameter than the rod passage having an end with an opening and sealingly and rigidly mounted on the piston in the rod passage and having another end bearing a spherical seat sealingly and rotatably receiving the smaller ball;
   and at least one passage through the piston from the tube opening into the second chamber.

2. The combination recited in claim 1, the second tube being elastically compressed between the first tube and piston.

3. The combination recited in claim 1, the first end wall having a portion with a cylindrical surface radially outwardly spaced from and concentric with the rod;
   a first boss on the piston with a cylindrical surface through which said at least one passage from the tube through the piston opens into the second chamber, said cylindrical surface having a diameter only slightly less than the diameter of the first end wall cylindrical surface and mating with the latter, upon the rod being fully extended from the cylinder, to at least partly close said at least one passage from the tube through the piston;
   a bore in the second end wall forming a cylindrical surface concentric with the rod;
   and a second boss on the piston with a cylindrical surface through which said at least one passage from the rod passage opens into the first chamber and which is of a diameter only slightly smaller than the bore diameter, the second boss cylindrical surface mating with the bore, upon complete retraction of the rod into the cylinder, to at least partially close said passage from the rod passage.

4. In combination,
   a cylinder with two closed ends;
   a piston slidably mounted in the cylinder and dividing the same into first and second chambers;
   a rod on the piston slidably extending through one of the closed ends and having an end lying outside the cylinder;
   a two-ended shank having one end mounted on said rod end;
   a larger ball on the other end of the shank;
   a passage extending through the ball, shank, and rod to the piston and having communication with the first chamber;
   a tube having one end rigidly mounted on the piston and extending through the passage, the tube being of smaller diameter than the passage and said one end communicating with the second chamber;

another end on the tube bearing a spherical seat concentric with the larger ball;

a spherical socket receiving the larger ball;

a tube rigidly mounted in the socket and having one end provided with a smaller ball mating with the spherical seat and another end adapted for connection into a fluid powering system, the diameter of the smaller ball being less than that of the passage;

and a tube adapted for connection into a fluid powering system and communicating with the exterior of the smaller ball.

References Cited in the file of this patent

UNITED STATES PATENTS

| | | |
|---|---|---|
| 398,143 | Gale | Feb. 19, 1889 |
| 413,965 | Rice | Oct. 29, 1889 |
| 1,534,439 | Burkhardt et al. | Apr. 21, 1925 |
| 1,537,437 | Graffinberger | May 12, 1925 |
| 1,717,485 | Wirz | June 18, 1929 |
| 1,874,248 | Davis | Aug. 30, 1932 |
| 1,937,244 | Pelton | Nov. 28, 1933 |
| 1,954,408 | Eliot | Apr. 10, 1934 |
| 2,680,596 | Houston | June 8, 1954 |
| 2,689,547 | Pearson | Sept. 21, 1954 |
| 2,723,574 | Mueller | Nov. 15, 1955 |
| 2,815,004 | Droman | Dec. 3, 1957 |
| 2,921,561 | Sendoykas | Jan. 19, 1960 |
| 2,996,047 | Denniston | Aug. 15, 1961 |
| 3,055,343 | Kurt | Oct. 25, 1962 |
| 3,064,741 | Morriston | Nov. 20, 1962 |

FOREIGN PATENTS

| | | |
|---|---|---|
| 27,179 | Great Britain | Dec. 23, 1898 |
| 1,062,120 | Germany | July 23, 1959 |